May 15, 1956     H. S. VAN BUREN, JR     2,745,163
FASTENING DEVICE
Filed Oct. 20, 1953
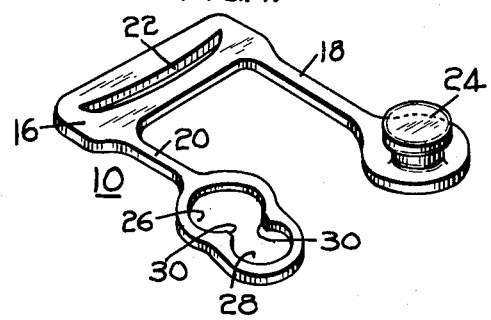
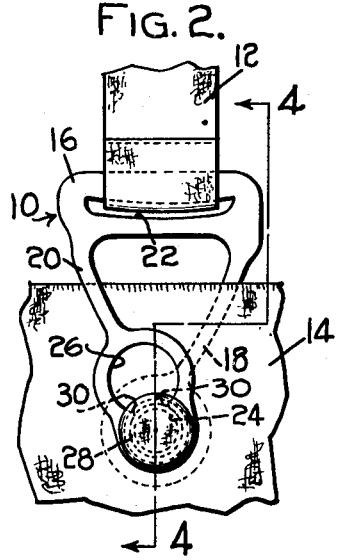
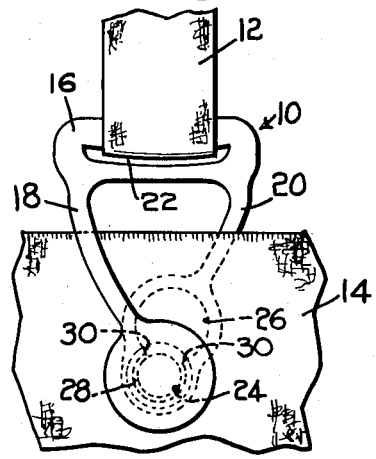
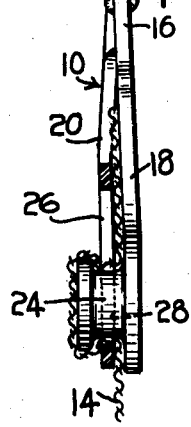
INVENTOR:
HAROLD S. VAN BUREN JR.
BY Robert E. Ross
ATTORNEY.

United States Patent Office 2,745,163
Patented May 15, 1956

2,745,163
FASTENING DEVICE

Harold S. Van Buren, Jr., Cambridge, Mass., assignor, by mesne assignments, to United-Carr Fastener Corporation, Boston, Mass., a corporation of Delaware Application October 20, 1953, Serial No. 387,210

1 Claim. (Cl. 24—246)

This invention relates generally to fastening devices, and has particular reference to a fastening device for attachment to a strap for engaging and supporting a garment.

The object of the invention is to provide a one piece molded plastic fastener for receiving a support strap and releasably engaging a garment to be supported.

Other objects of the invention will in part be obvious, and will, in part, appear hereinafter.

In the drawing:

Fig. 1 is a perspective view of a fastening device embodying the features of the invention.

Fig. 2 is a top plan view of the fastener of Fig. 1 assembled onto a strap and engaged with a portion of a garment to be supported.

Fig. 3 is a view of the assembly of Fig. 2 as seen from the opposite side.

Fig. 4 is a view in section when on line 4—4 of Fig. 2.

Referring to the drawing, there is illustrated a fastening device 10, which is adapted for attachment to a supporting strap 12, and for engagement with a portion of a garment 14 to be supported by the strap.

The fastener 10 is preferably formed of a single piece of molded flexible plastic such as polyethylene or polyamide and comprises an elongated strap-receiving portion 16 which is substantially flat, and a pair of flexible legs 18 and 20 extending in the same general direction from opposite ends thereof, lying in substantially the same plane as the strap-receiving portion.

To receive the strap 12, one or more elongated slots 22 are provided in the strap-receiving portion 16.

The legs 18 and 20 are flexible and adapted to be superimposed into opposite sides of the garment 14 to be supported to provide means for engaging the garment, the leg 18 is provided with a shouldered stud 24 which protrudes from the end thereof and the leg 20 is provided with a keyhole aperture on the end consisting of an assembly aperture 26 which is larger than the head of the stud, and a retaining aperture 28 connecting thereto, which is smaller than the head of the stud but larger than the neck thereof.

The fastener 10 is assembled by attaching it to the strap 12 by means of the strap slot 22. The legs may then be flexed together so as to be superimposed onto opposite sides of the garment to be supported, and the stud inserted through the assembly aperture 20 so that it carries with it a layer of the garment. The stud is then slid into the retaining aperture 28. To insure that the stud will remain in the aperture 28, inwardly projecting shoulders 30 may be provided at the entrance to the aperture 28, so that the neck of the stud snaps therebetween to be securely retained in assembly.

Although the fastener is particularly adapted for use as a hosiery supporter, it is readily adapted for use in supporting other types of garments.

Since certain obvious changes may be made in the device without departing from the scope of the invention, it is intended that all matter contained herein be interpreted in an illustrative and not in a limiting sense.

I claim:

A garment supporting device formed of a single piece of molded flexible plastic, comprising an elongated strap receiving portion having longitudinally extending slot means therein to receive a supporting strap, and a pair of laterally flexible legs integrally formed with said strap receiving portion, each of which extends downwardly from one end of and in the same plane as the strap receiving portion in spaced parallel relation to one another, said legs being constructed to be overlapped by their lateral flexibility at the respective free ends on two opposite sides of a garment to be supported, one of said legs being provided with an integral stud means immediately adjacent its free end, and the other leg having a keyhole aperture with the smaller portion immediately adjacent its free end for receiving the stud for engaging a portion of the garment between the two end portions.

References Cited in the file of this patent

UNITED STATES PATENTS

| | | |
|---|---|---|
| 471,104 | Daniels | Mar. 22, 1892 |
| 748,189 | Hoy | Dec. 29, 1903 |
| 2,018,445 | Jacobs | Oct. 22, 1935 |
| 2,624,093 | Hatch | Jan. 6, 1953 |

FOREIGN PATENTS

| | | |
|---|---|---|
| 355,731 | Germany | of 1922 |